Patented Jan. 4, 1927.

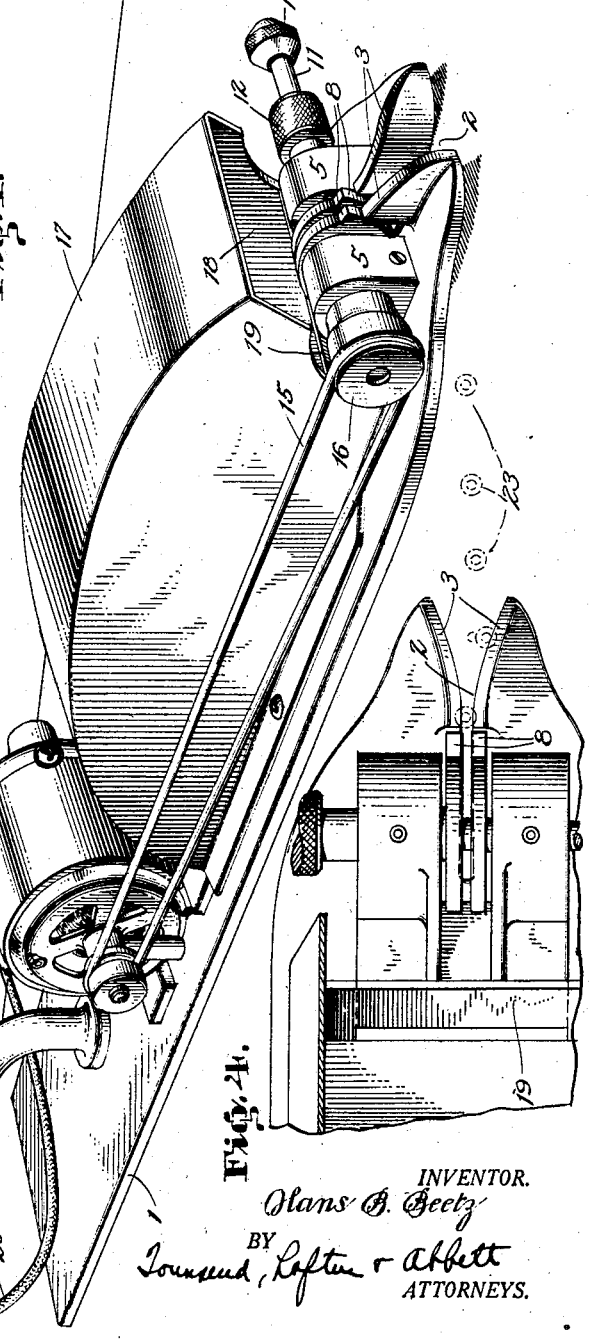

1,612,793

UNITED STATES PATENT OFFICE.

HANS B. BEETZ, OF SAN FRANCISCO, CALIFORNIA.

TACK AND NAIL EXTRACTOR.

Application filed March 3, 1926. Serial No. 91,918.

This invention relates to a tack and nail extractor of the type shown in my Patent No. 1,502,229 dated July 22, 1924. The primary object of my present invention is to provide an extractor having improved features not disclosed heretofore in my said patent.

As is well known in the art, furs and skins are commonly nailed to a board or like surface during the tanning, shaping, dyeing, or like treatment. Only the points of these nails or tacks are driven into the boards, the heads thereof projecting out considerably. The object of my invention is to provide an improved power operating extractor which will quickly remove these nails and place the same in a hopper merely by running the extractor along the row of nails to be removed.

It will be understood that nails varying in diameter may often be used and many of these nails may be bent quite out of line. It is a further object of my invention to provide a nail puller which can be adjusted to accommodate the diameter of nail to be pulled, and which will function to automatically bring any bent nail into line to be extracted.

A further object of my invention is to provide the nail receiving hopper with means near the mouth thereof for preventing escape of the extracted nails.

In the accompanying drawing I have illustrated certain specific embodiments of my invention, but it will be understood that the invention can be otherwise embodied and that the drawing is not to be construed as defining or limiting the scope of the invention, the claims appended to this specification being relied upon for that purpose.

Referring to the figures of the drawing:

Figure 1 is a perspective view of my improved tack and nail extractor.

Figure 2 is a cross sectional view thereof on line II—II of Fig. 3.

Figure 3 is a sectional view taken on line III—III of Fig. 2.

Figure 4 is a fragmentary plan view of the forward end of the extractor.

In the drawing, 1 indicates the base of my extractor, which base may be a flat metal plate as illustrated. A V-shaped recess 2 is provided in the forward end thereof, upwardly extending guide walls 3 being provided at the edges of this recess. A shaft 4 is rotatably mounted in bearings 5 just rearwardly of this recess and the extracting member, comprising a pair of relatively spaced elements 6 and 7 provided with peripheral teeth 8 thereon, is mounted on this shaft.

The element 6 is mounted directly on the shaft 4 and the element 7 is mounted on one end of a bushing 9, loose on the shaft. This bushing is adjustable axially on the shaft in a manner permitting the space between the two elements to be varied for extracting nails of different diameters. Two posts 10 on the element 6 engage in corresponding holes in the element 7 in a manner permitting this axial adjustment without permitting any relative rotation of the elements. It will be noted that the teeth 8 of the two elements are arranged directly opposite each other in a manner providing two surfaces for engaging beneath opposite sides of the head of the nail or tack to be extracted.

The adjusting mechanism for the bushing 9 is as follows. The adjacent ends of the bushing and shaft are threaded. A second bushing 11 having its inner end shouldered, is threaded onto the shaft, the bushing 9 resting against this second bushing. A third bushing 12 engages over the bushing 11 and against its shoulder and threads onto the bushing 9 in a manner holding bushings 9 and 11 secured together. A nut 13 threads onto the shaft against the bushing 12. It will be noted that by loosening the nut 13 and bushing 12, the bushing 11 can be adjusted to any desired position along the shaft and that such adjustment varies the position of the element 7 relative to the element 6 axially.

The shaft 4 is driven from a motor 14 through a belt 15 extending over a pulley 16 on the shaft. A hopper 17 is mounted on the base and has its open mouth 18 arranged adjacent the extractor in a position to receive the nails as they are extracted. A plate 19 is provided in the bottom of the hopper to the rear of the extractor to prevent the escape of the nails. An electric cord 20 for the motor may be extended through the handle 21 and a thumb switch provided at 22.

The operation of the device is believed to be obvious. When a row of nails 23 is to be extracted, the operator guides the device therealong so that the nails enter the recess 2 and are guided thereinto by the V-walls thereof. Should a nail be bent out of line, the walls 3 automatically bring the same into line to be engaged by the extractor. As the nails pass through the rear end of the recess, they pass into the gap between the elements 6 and 7 and the teeth 8 thereof pull the nails and throw them into the hopper 17. The distance between the extractor elements can be adjusted to accommodate different diametered nails in the manner heretofore described. The hopper can be emptied by turning the device upside down and pouring the nails therefrom, the wall 19 preventing escape of the nails during the operation of the machine.

Having thus described my invention, what I claim is:

1. A tack puller comprising the combination of a base having an open recess in one end thereof, a rotary extracting member comprising two axially spaced elements having means on the peripheries thereof for engaging and extracting tacks, the said recess extending inwardly to a position adjacent the space between the two elements at the periphery thereof, means for relatively adjusting the elements to vary the said space therebetween, and means for rotating the member in a direction to engage and extract tacks passing through the said recess.

2. A tack puller comprising the combination of a base having an open recess in one end thereof, a rotary extracting member comprising two relatively spaced elements having teeth thereon for engaging and extracting tacks, the said recess extending inwardly to a position adjacent the space between the two elements, a hopper on the base having an open mouth adjacent the extracting member, means extending across the bottom of the hopper adjacent the said mouth for preventing the escape of tacks therefrom, and means including an electric motor on the base for rotating the member in a direction to engage tacks passing through the said recess and to extract the tacks and throw the same into the hopper.

3. A tack puller comprising the combination of a plate-like base having an open recess in one edge thereof, a rotary extracting member comprising two spaced elements having means thereon for engaging and extracting tacks, the said recess extending inwardly to a position adjacent the space between the two elements, means for adjusting the elements to vary the said space therebetween, means permitting such adjustment but preventing relative rotation of the two elements, and means for rotating the member in a direction to engage and extract tacks passing through the said recess.

4. A tack puller comprising the combination of a base having an open V-shaped recess in one edge thereof, a rotary extracting member having means on the periphery thereof for engaging and extracting tacks, the said recess converging inwardly to a position adjacent the periphery of the member upwardly extending V-shaped guide walls carried by the member at the edges of the recess for straightening and guiding tacks thereinto, and means for rotating the member in a direction to engage and extract tacks passing through the said recess.

HANS B. BEETZ.